Patented Oct. 16, 1951

2,571,985

UNITED STATES PATENT OFFICE 2,571,985

POLYETHER SUBSTITUTED OXAZOLIDINES AND THE LIKE

Joseph J. Carnes, Greenwich, Conn., assignor to American Cyanamid Company, New York, N. Y., a corporation of Maine No Drawing. Application July 13, 1949, Serial No. 104,583

12 Claims. (Cl. 260—307)

The present invention relates to the preparation of 2-substituted oxazolidine-polyether compounds.

It is an object of this invention to prepare a 2-substituted oxazolidine of the general formula

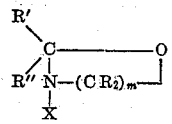

in which X is a member of the group consisting of the radicals

—[(CR$_2$)$_a$O]$_n$H and —(CH$_2$CHOHCHO)$_n$H, $a$ being 1 to 4 inclusive, $m$ being 2 to 3 inclusive, $n$ being 1 to 100 inclusive, R being a member of the group consisting of H and aliphatic radicals; R' being a member of the group consisting of H, aliphatic, aromatic, and heterocyclic radicals; and R'' being a member of the group consisting of aliphatic, aromatic, and heterocyclic radicals.

Compounds of this formula are valuable as intermediates particularly in the synthesis of surface active agents, textile lubricants, and for other purposes.

The polyether substituted oxazolidines of the present invention are, in general, water soluble and tend to hydrolyze readily in aqueous solutions.

The process for making the compounds of the above formula may be described briefly as follows. A plural-carbon aldehyde or ketone such as acetaldehyde, acetone, benzaldehyde, isobutyraldehyde, and an alkylol amine such as ethanolamine are dissolved in a suitable solvent and reacted for a suitable period of time in an apparatus which permits stripping out the by-product water as it is formed, according to the known methods for making the oxazolidines and oxazines. There remains dissolved in the solvent a 2-substituted oxazolidine, for example. The solvent is distilled off and the oxazolidine is left in the still. The oxazolidine is then reacted with a compound containing the group

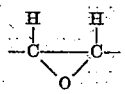

such as ethylene oxide, glycidol, or the like, in a suitable solvent. The epoxy compound adds at the nitrogen atom of the oxazolidine ring, and a fairly large number of mols of epoxy compound may be so added, creating in effect a polyether side chain terminating in hydroxyl. While up to about 100 mols of epoxy compound may be so added, the reaction proceeds faster if a smaller number, such as 50 or less, is added. For commercial purposes 30 or 40 will frequently be found to be the optimum number of mols.

The process is not confined to the oxazolidines. The 6-membered oxazine ring made by reacting propanolamine with a plural-carbon aldehyde or a ketone also condenses with epoxy compounds of the type described to give hydrolyzable N-substituted polyether amines. The ring may be formed with almost any of the commoner aldehydes or ketones. Preference is given to the less expensive ones purely from the viewpoint of economy; therefore, acetone is preferred for the reaction. Although the two substituents on the carbonyl group of the aldehyde or ketone are susceptible to a wide degree of variation, it is preferable to leave them fairly simple.

A great variety of epoxy compounds is available. Ethylene oxide is preferred because of its relative cheapness, but ethylene oxide derivatives such as propylene oxide, glycidol, butadiene monoxide, and isobutylene oxide are also suitable. If ethylene oxide is used, the speed of reaction may be increased by employing a suitable catalyst such as triethylamine. The excess of epoxy compound may be varied over wide limits. Obviously, at least one mol of epoxy compound must be used for each mol of substituted oxazolidine. No preference as to the ratio of epoxy compound to oxazolidine compound may be stated, as it is clear that this will depend upon the end product desired.

All the reactions discussed may be carried out by refluxing at atmospheric pressure, and this mode of preparation is especially preferable in making the compound containing the oxazolidine ring, in which process it is desirable to strip out water during the reaction. However, the actual condensation of the oxazolidine compound with the epoxy compound may be carried out in an autoclave if desired.

The following examples illustrate the invention. While specific details are described, it will be understood that these examples are given primarily for the purpose of illustration and that the invention in its broader aspects is not limited thereto.

PREPARATION OF OXAZOLIDINES

*Example 1*

2-PHENYLOXAZOLIDINE

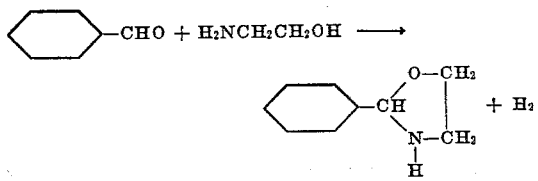

A mixture of 212 g. (2.0 mols) of benzaldehyde, 126 g. (2.0 mols+1% excess) of 98% ethanolamine, and 150 ml. of benzene was refluxed with stirring for 3½ hours, stripping out the water in a trap. After 37.5 ml. of water was collected, the benzene was distilled off under water pump pressure. The residue was distilled through a Vigreux column. There was collected 227 g. of 2-phenyloxazolidine, a clear, colorless product boiling at 93–4° C./0.8 mm., a 76% yield.

*Example 2*

2-ISOPROPYLOXAZOLIDINE

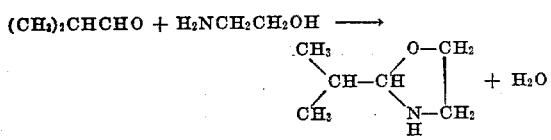

By the same procedure, isobutyraldehyde 72 g. (1.0 mol) was condensed with 61 g. (1.0 mol) of ethanolamine in 250 ml. of benzene. The yield of 2-isopropyloxazolidine, a clear, colorless liquid boiling at 55–9° C./15 mm., was 91 g., 79% of theory.

*Example 3*

2,2-DIMETHYL-4-ETHYLOXAZOLIDINE

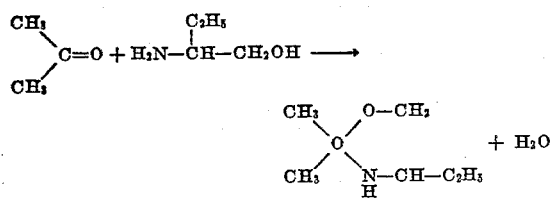

Acetone, 48 g. (0.83 mol), and 74 g. (0.83 mol) of 2-aminobutanol-1 were condensed in 200 ml. of refluxing benzene as above. The 2,2-dimethyl-4-ethyloxazolidine was a clear, colorless liquid boiling at 57–60° C./25 mm. The yield was 68 g., 64% of theory.

CONDENSATION OF OXAZOLIDINES WITH ALKYLENE OXIDES

*Example 4*

2-PHENYLOXAZOLIDINE+10 MOLS ETHYLENE OXIDE

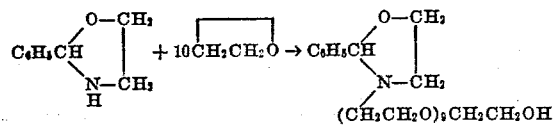

A solution of 100 g. (0.672 mol) of 2-phenyloxazolidine as prepared in Example 1, and 7 g. of triethylamine in 100 ml. of sec.-butyl alcohol was placed in a flask fitted with stirrer, thermometer, gas inlet tube, and cold reflux condenser. The solution was heated to 100° C. and ethylene oxide from a weighed tank was passed in at 90–100° C. until 297 g. (6.75 mol) had been absorbed. This required ten hours. After heating for an additional 3½ hours at 100–105° C., refluxing had ceased.

The solvent and volatile materials were distilled off under water pump pressure up to 130° C. The polyglycol substituted-2-phenyloxazolidine remaining was a dark red, viscous oil. It could not be distilled under normal conditions without decomposition.

*Example 5*

2-PHENYLOXAZOLIDINE+35 MOLS ETHYLENE OXIDE

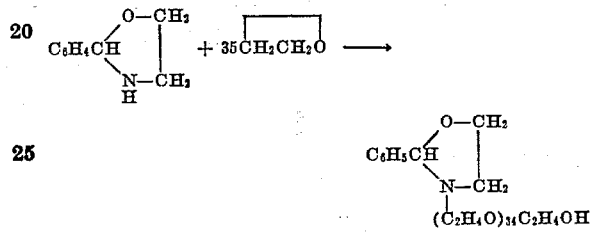

In this preparation, 25 g. (0.167 mol) of 2-phenyloxazolidine as prepared in Example 1 in 25 ml. of sec.-butyl alcohol was condensed with 250 g. (5.68 mols) of ethylene oxide in the presence of 2 g. of triethylamine as catalyst. The procedure was the same as in Example 4. The result was a brown viscous oil, which could not be distilled under normal conditions without decomposition.

*Example 6*

2-PHENYLOXAZOLIDINE+4 MOLS GLYCIDOL

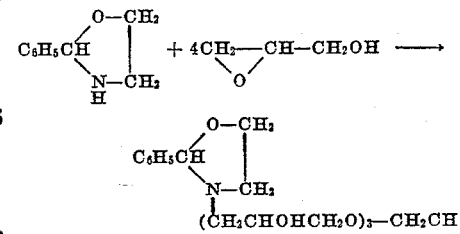

Glycidol, 30 g. (0.405 mol) was added dropwise with stirring to 15.1 g. (0.101 mol) of 2-phenyloxazolidine (as prepared in Example 1) at 150–160° C. The reaction was exothermic and no heating was required during the addition. The preparation was completed by heating for another hour at the same temperature. The polyglycol substituted -2-phenyloxazolidine was a dark brown viscous oil, which could not be distilled under normal conditions without decomposition.

*Example 7*

2-ISOPROPYLOXAZOLIDINE+2 MOLS PROPYLENE OXIDE

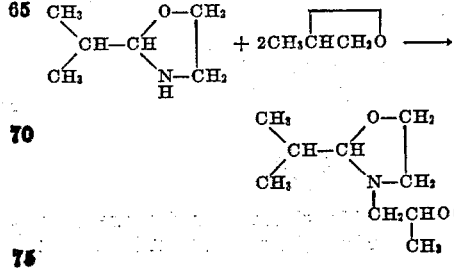

A mixture of 29 g. (0.25 mol) of 2-isopropyl-oxazolidine as prepared in Example 2 and 29 g. (0.50 mol) of propylene oxide was placed in a stainless steel autoclave and heated at 165° C. until the pressure had fallen to approximately 30 p. s. i. and remained constant. The product was a yellow, viscous oil.

*Example 8*

2,2-DIMETHYL-4-ETHYLOXAZOLIDINE+4.3 MOLS ETHYLENE OXIDE

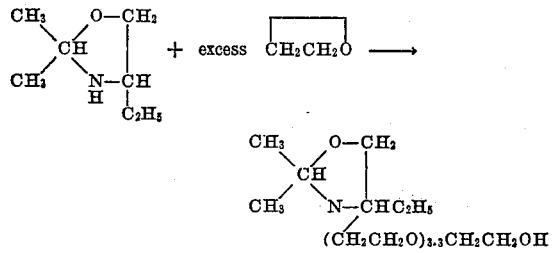

(In the last formula "3.3" means the average number of $CH_2CH_2O$— groups; that is, the compound is a mixture of polyether oxazolidines in which some of the molecules have a whole number of $CH_2CHO$— groups greater than 3.3 and some a number less than 3.3, the statistical average being 3.3.)

Ethylene oxide was passed as in Example 1 into a solution of 32 g. (0.25 mol) of 2,2-dimethyl-4-ethyloxazolidine prepared as per Example 3, and 2.5 g. of triethylamine in 25 ml. of sec.-butyl alcohol until 55 g. (1.25 mols) of the oxide had been absorbed. This addition required 8 hours at 85–99° C.

After the mixture had been heated for 3 hours at 90–95° C., the solvent and volatile materials were distilled off up to 155° C. at 35 mm. pressure. Some unreacted oxazolidine distilled over at this point. The remaining polyglycol oxazolidine was a dark red viscous oil, which could not be distilled without decomposition.

While the invention has been described with particular reference to specific embodiments, it is to be understood that it is not to be limited thereto but is to be construed broadly and restricted solely by the scope of the appended claims.

This case is a continuation-in-part of co-pending application, Serial No. 25,073, filed May 4, 1948.

I claim:
1. A compound of the formula

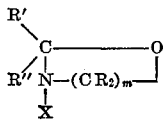

in which X is a member of the group consisting of the radicals —$[(CR_2)_aO]_nH$ and
—$(CH_2CHOHCHO)_nH$
$a$ being 1 to 4 inclusive, $m$ being 2 to 3 inclusive, $n$ being 1 to 100 inclusive, R being a member of the group consisting of H and aliphatic radicals; R' being a member of the group consisting of H, aliphatic and aromatic radicals; and R'' being a member of the group consisting of aliphatic and aromatic radicals.

2. The compound of claim 1 in which X is —$[(CR_2)_aO]_nH$.

3. The compound of claim 1 in which X is —$(CH_2CHOHCHO)_nH$.

4. A 2-phenyloxazolidine of the formula

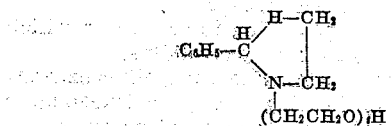

in which $t$ is 30 to 40.

5. A 2-phenyloxazolidine of the formula

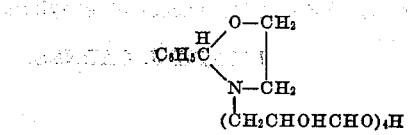

6. A 2-isopropyloxazolidine of the formula

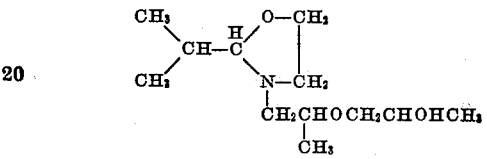

7. The method of making a polyether heterocyclic compound comprising heating a compound of the formula

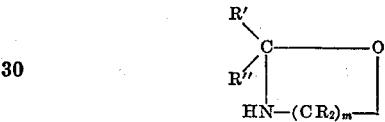

in which $m$ is 2 to 3 inclusive, R is a member of the group consisting of H and aliphatic radicals, R' is a member of the group consisting of H, aliphatic and aromatic radicals, and R'' a member of the group consisting of aliphatic and aromatic radicals in the presence of an

containing compound, the mol ratio of heterocyclic reactant to said

containing reactant being in the range 1:1 to 1:100.

8. The method of making a polyether oxazolidine comprising heating an oxazolidine of the formula

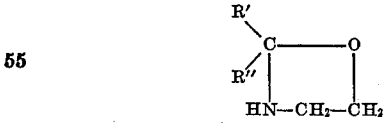

in which R' and R'' are as defined in claim 7, with an

containing compound, the mole ratio of oxazolidine reactant to said

containing reactant being in the range 1:1 to 1:100.

9. The method according to claim 8 in which the

containing compound is ethylene oxide and the reactant molar range is 1:30-40.

10. The method according to claim 9 in which the axazolidine is 2-phenyloxazolidine.

11. The method of making a polyether oxazolidine comprising heating 2-isopropyloxazolidine with a 30-40 molar excess of ethylene oxide.

12. The method of making a polyether oxazolidine comprising heating 2,2-dimethyl-4-ethyloxazolidine with a 30-40 molar excess of ethylene oxide.

JOSEPH J. CARNES.

REFERENCES CITED

The following references are of record in the file of this patent:

UNITED STATES PATENTS

| Number | Name | Date |
|---|---|---|
| 2,312,344 | Logemann | Mar. 2, 1943 |
| 2,377,507 | Marker | June 5, 1945 |
| 2,387,830 | Butz | Oct. 30, 1945 |